(12) United States Patent
Guo et al.

(10) Patent No.: US 9,124,509 B2
(45) Date of Patent: Sep. 1, 2015

(54) METHOD, APPARATUS, AND SYSTEM FOR CONTROLLING NETWORK TRAFFIC SWITCHING

(75) Inventors: Dayong Guo, Beijing (CN); Baolian Chen, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 379 days.

(21) Appl. No.: 13/536,552

(22) Filed: Jun. 28, 2012

(65) Prior Publication Data
US 2012/0269087 A1  Oct. 25, 2012

Related U.S. Application Data

(63) Continuation of application No. PCT/CN2010/079546, filed on Dec. 8, 2010.

(30) Foreign Application Priority Data

Dec. 30, 2009  (CN) .......................... 2009 1 0261817

(51) Int. Cl.
*H04L 12/26* (2006.01)
*H04L 12/729* (2013.01)
*H04L 12/715* (2013.01)
*H04L 12/751* (2013.01)

(52) U.S. Cl.
CPC .............. *H04L 45/125* (2013.01); *H04L 45/02* (2013.01); *H04L 45/04* (2013.01)

(58) Field of Classification Search
CPC ... H04W 24/00; H04L 43/50; H04L 43/0852; H04L 3/08; H04B 17/003
USPC .................................. 370/252, 254, 255, 248
See application file for complete search history.

(56) References Cited

U.S. PATENT DOCUMENTS 6,339,595 B1 * 1/2002 Rekhter et al. ................ 370/392
2004/0073715 A1 * 4/2004 Folkes et al. .................. 709/250
(Continued)

FOREIGN PATENT DOCUMENTS

CN  101309198 A   11/2008
CN  101447913     6/2009
(Continued)

OTHER PUBLICATIONS

Written Opinion of the International Searching Authority dated Mar. 17, 2011 in connection with International Patent Application No. PCT/CN2010/079546.
(Continued)

*Primary Examiner* — Eunsook Choi
*Assistant Examiner* — Siren Wei

(57) ABSTRACT

The embodiments of the present invention disclose a method, an apparatus, and a system for controlling network traffic switching. The method for controlling network traffic switching includes: establishing a direct link interface, where the direct link interface has an address attribute of a peer node, and a value of the attribute is a peer node address of the direct link; and comparing a border gateway protocol (BGP) next-hop address of each route in a routing table with the peer node address of the direct link, and switching traffic on a route that matches a comparison result to the direct link. By using the preceding technical solution, after a direct link is established between nodes, a relevant node establishes a new type of interface for the direct link.

10 Claims, 2 Drawing Sheets

(56) References Cited

U.S. PATENT DOCUMENTS

| | | | |
|---|---|---|---|
| 2005/0100027 A1 | 5/2005 | Leinwand et al. | |
| 2006/0153200 A1* | 7/2006 | Filsfils et al. | 370/395.31 |
| 2007/0274212 A1* | 11/2007 | Kolenchery et al. | 370/232 |
| 2009/0034532 A1 | 2/2009 | Hsu et al. | |
| 2009/0268739 A1* | 10/2009 | Dunbar et al. | 370/392 |

FOREIGN PATENT DOCUMENTS

| | | |
|---|---|---|
| CN | 101447913 A | 6/2009 |
| CN | 101854291 A | 10/2010 |
| CN | 101969581 A | 2/2011 |
| EP | 2 157 736 A1 | 2/2010 |
| EP | 2 413 540 A1 | 2/2012 |
| WO | WO 2009/076826 A1 | 6/2009 |

OTHER PUBLICATIONS

Qiang Yan, et al., "Performance Evaluation of Multi-Layer Traffic Engineering Enabled IP-over-ION Networks", Photonic Network Communications, 9:3, p. 255-280, 2005.

Supplementary European Search Report, dated Aug. 13, 2012 in connection with European Patent Application No. 10840484.9, 7 pages.

Nabil Bitar Verizon, Jean-Louis Le Roux et al., "Framework for PCE based inter-domain path computation", Jun. 1, 2006, 18 pages.

Partial translation of Office Action dated Dec. 7, 2012 in connection with Chinese Patent Application No. 200910261817.3.

International Search Report dated Mar. 17, 2011 in connection with International Patent Application No. PCT/CN2010/079546.

W. Colitti, et al., "Adaptive Multilayer Routing in the Next Generation GMPLS Internet", 2008 3rd International Conference on Communication System Software and Middleware and Workshops, vols. 1 and 2, 2008, pp. 768-775.

Sangjin Jeong, et al., "Optical BGP Routing Convergence in Lightpath Failure of Optical Internet", ETRI Journal, vol. 24, No. 2, Apr. 2002, p. 97-108.

Marc Blanchet, et al., "Optical BGP (OBGP): InterAS lightpath provisioning", Network Working Group, Jan. 2001, 8 pages.

Y. Rekhter, Ed., et al., "A Border Gateway Protocol 4 (BGP-4)", Network Working Group, Jan. 2006, 104 pages.

* cited by examiner

ən interface establishing unit, configured to establish a direct link interface, where the direct link interface has an address attribute of the peer node, and a value of the attribute is a peer node address of the direct link;

METHOD, APPARATUS, AND SYSTEM FOR CONTROLLING NETWORK TRAFFIC SWITCHING

CROSS-REFERENCE TO RELATED APPLICATIONS

This application is a continuation of International Application No. PCT/CN2010/079546, filed on Dec. 8, 2010, which claims priority to Chinese Patent Application No. 200910261817.3, filed on Dec. 30, 2009, both of which are hereby incorporated by reference in their entireties.

TECHNICAL FIELD

The present invention relates to the field of communication technologies, and in particular, to a method, an apparatus, and a system for controlling network traffic switching.

BACKGROUND

As a network technology develops rapidly, various kinds of new services, such as Web 2.0, P2P, video sharing, and IPTV, emerge continuously. As a result, network traffic is continued to be increased exponentially for a long term. A traditional layered network structure imposes a higher requirement on a core node. As the network traffic is increased, capacity of the core node becomes a bottleneck for network development. In addition, pass-through traffic is forwarded through multiple nodes, which needs a large number of router ports, thereby increasing a networking cost.

To solve the preceding problem, in the industry, a technology based on MTE (Multi-layer Traffic Engineering, multi-layer traffic engineering) is proposed to implement dynamic traffic grooming. A basic principle is: An optical-layer direct link is established for large-granularity traffic to pass through the traffic directly through an optical-layer channel without hop-by-hop processing through nodes.

However, in the prior art, the problem is that: A new direct link changes a network topology, and an IP network is based on a shortest path forwarding mechanism, therefore, abnormal traffic may be drawn to the direct link, thereby leading to a traffic overload on the link.

SUMMARY

To solve the preceding technical problem, embodiments of the present invention provide a method, an apparatus, and a system for controlling network traffic switching to solve a problem that abnormal traffic is drawn to a direct link. Technical solutions are as follows:

A method for controlling network traffic switching is provided in an embodiment of the present invention, where a direct link exists between a local node and a peer node. The method for controlling network traffic switching includes:

establishing a direct link interface, where the direct link interface has an address attribute of the peer node, and a value of the attribute is a peer node address of the direct link; and comparing a border gateway protocol (BGP) next-hop address of each route in a routing table with the peer node address of the direct link, and switching traffic on a route that matches a comparison result to the direct link.

A network node is further provided in an embodiment of the present invention, where a direct link exists between a local node and a peer node. The network node includes:

an interface establishing unit, configured to establish a direct link interface, where the direct link interface has an address attribute of the peer node, and a value of the attribute is a peer node address of the direct link;

a comparing unit, configured to compare a border gateway protocol (BGP) next-hop address of each route in a routing table with the peer node address of the direct link; and a traffic switching unit, configured to switch traffic on a route that matches a comparison result of the comparing unit to the direct link.

A network system is further provided in an embodiment of the present invention, including a network management device and a network node, where the network management device is configured to establish a direct link between a first network node and a second network node; and the network node is configured to establish a direct link interface after the network management device establishes a direct link between a local node and a peer node, where the direct link interface has an address attribute of the peer node, and a value of the attribute is a peer node address of the direct link, and compare a border gateway protocol (BGP) next-hop address of each route in a routing table with the peer node address of the direct link, and switch traffic on a route that matches a comparison result to the direct link.

By using the technical solutions provided in the embodiments of the present invention, after a direct link is established between nodes, a relevant node establishes a new type of interface for the direct link. By comparing a peer node address of the newly established interface with a next-hop address of an original route, it can be ensured that only route traffic that needs to be switched is switched to the direct link. Other traffic that does not need to be switched still stays in the original route, so that the problem that abnormal traffic is drawn to the direct link is avoided.

BRIEF DESCRIPTION OF THE DRAWINGS

To describe the technical solutions in the embodiments of the present invention or in the prior art more clearly, the accompanying drawings required for describing the embodiments or the prior art are briefly introduced in the following. Apparently, the accompanying drawings in the following description are merely some embodiments of the present invention. Those skilled in the art can still obtain other drawings according to these accompanying drawings without any creative effort.

DETAILED DESCRIPTION

The technical solutions in the embodiments of the present invention are clearly and fully described in the following with reference to the accompanying drawings in the embodiments of the present invention. Apparently, the embodiments to be described are only a part rather than all of the embodiments of the present invention. Based on the embodiments of the present invention, all other embodiments obtained by those skilled in the art without any creative effort shall fall within the protection scope of the present invention.

Figure 1:
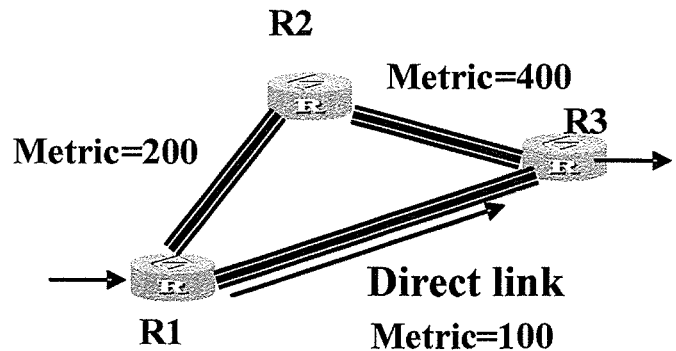
FIG. 1 is a schematic diagram of a network according to an embodiment of the present invention.

A network as shown in FIG. 1 is taken as an example. R1, R2, and R3 are router nodes. A network management system detects that traffic between R1 and R3 is heavier, and therefore an optical-layer direct link between R1 and R3 is established to groom the traffic between R1 and R3. This link is also called bypass (bypass). After the direct link is established, the link is released to the network. Meanwhile, a smaller metric (metric) value is selected for the direct link, so that the traffic from R1 to R3 is switched to this direct link. In actual configuration, if a link metric is too small, for example, a metric value of the direct link is set as metric=100, other traffic may be drawn. However, after the direct link is established, the total metric value of (R2-R1-R3) is (200+100), and a metric value of (R2-R3) is 400. According to a shortest path forwarding mechanism, original traffic from R2 to R3 is also drawn to a path of (R2-R1-R3). As a result, the direct link from R1 to R3 is overloaded.

The preceding is only a simple example. In fact, for a network with a complicated structure, it is hard to calculate a proper metric value which can not only ensure that traffic which needs to be switched is switched to a direct link, and but also ensure that other traffic which does not need to be switched stays in an original path. In theory, a static route may also be configured to specify which traffic needs to pass through a direct link, so that a problem that abnormal traffic is drawn to the direct link is avoided. This method, however, requires participation of humans. For a complicated network, a workload for static configuration is quite heavy. Therefore, this method is also impractical.

To solve the preceding problem in the prior art, a method for controlling network traffic switching is provided in an embodiment of the present invention, where a direct link exists between a local node and a peer node. The method includes the following steps:

establishing a direct link interface, where the direct link interface has an address attribute of the peer node, and a value of the attribute is a peer node address of the direct link; and comparing a border gateway protocol (BGP) next-hop address of each route in a routing table with the peer node address of the direct link, and switching traffic on a route that matches a comparison result to the direct link.

An execution entity of the preceding method may be a network node at either end of the direct link. By using the preceding method, after a direct link is established, a relevant node establishes a new type of interface for the direct link. By comparing a peer node address of the newly established interface with a next-hop address of an original route, it can be ensured that only route traffic that needs to be switched is switched to the direct link. Other traffic that does not need to be switched still stays in the original route, so that the problem that abnormal traffic is drawn to the direct link is avoided.

Figure 2:
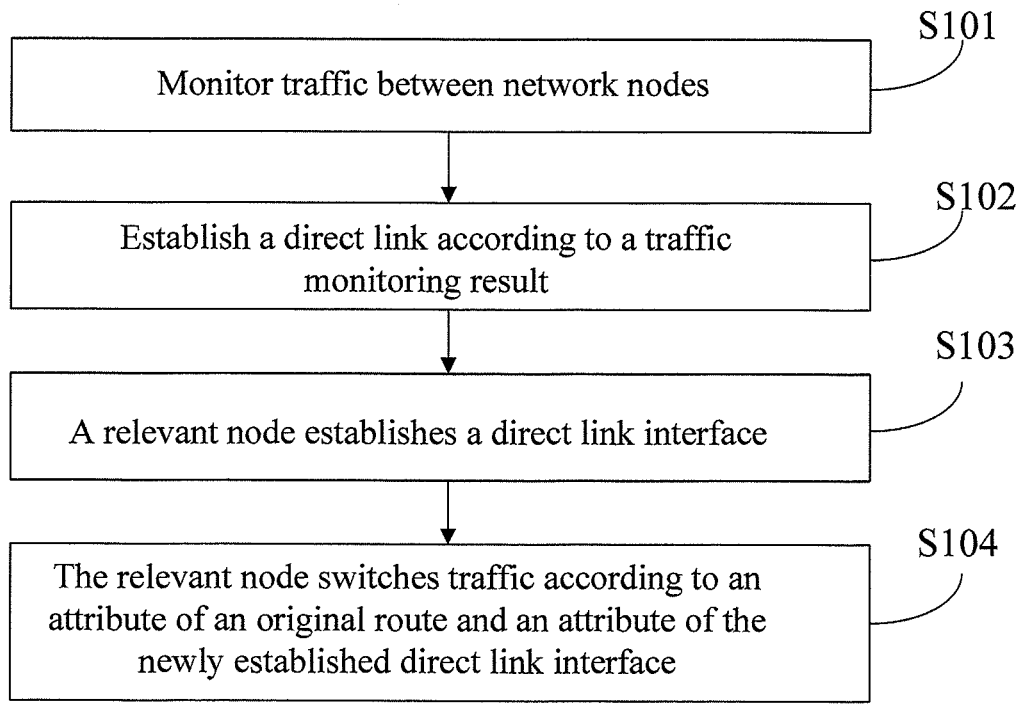
FIG. 2 is a flowchart of a method for controlling network traffic switching according to an embodiment of the present invention.

The technical solutions of the present invention are described in further detail in the following with reference to a specific embodiment:

As shown in FIG. 2, the method for controlling network traffic switching provided in this embodiment includes the following steps:

Step 101: Monitor traffic between network nodes.

Figure 3:
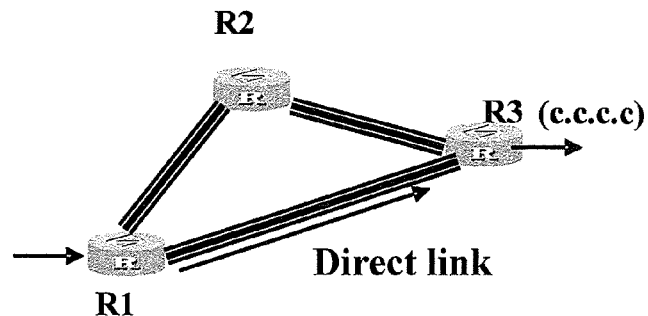
FIG. 3 is a schematic diagram of another network according to an embodiment of the present invention.

In this embodiment, as shown in FIG. 3, a simple network formed by R1, R2, and R3 is still taken as an example for description, A network management device (which is not marked in the figure) monitors traffic between each router node on the entire network. In this embodiment, devices, such as a user operation terminal, a traffic collection server, and a bypass control server, are collectively called a network management device. Specific implementation of traffic monitoring may use the prior art, and this embodiment is briefly described.

In this embodiment, R1, R2, and R3 are Provider Edge (Provider Edge, provider edge) routers. A router line card performs sampling on a traffic packet according to a certain proportion (for example, 1:1000) and reports a mirror image of a sampled packet to the traffic collection server. According to a traffic monitoring rule of BGP next-hop, the traffic collection server performs an analysis and statistic on content reported by the router line card to monitor traffic between BGP PEs;

Step 102: Establish a direct link according to a traffic monitoring result.

The bypass control server regularly obtains, through a management interface (for example, Simple Network Management Protocol (SMNP) interface), traffic information that is monitored by the traffic collection server. The bypass control server determines, according to a certain rule, whether a direct link needs to be established between routers, and provides a relevant suggestion for the user operation terminal. The user operation terminal decides, according to the suggestion of the bypass control server, whether to establish a direct link.

A rule for determining whether to establish a direct link and a specific method for establishing a direct link can be implemented by using the prior art, which are not limited in this embodiment. In addition, establishing a direct link does not necessarily depends on a traffic monitoring result. The technical solutions of the present invention are described in the following by taking a direct link that is established between R1 and R3 as an example;

Step 103: A relevant node establishes a direct link interface.

After establishing the direct link, the network management device sends an indication indicating that the direct link is established successfully to relevant nodes (R1 and R3 in this embodiment). After receiving the indication, R1 and R3 establish a direct link interface for itself respectively. R1 is taken as an example for description in the following.

After receiving an indication indicating that the direct link is established successfully, R1 establishes a new type of interface for the direct link. This new type of interface may be called a direct link interface or a bypass interface. The bypass interface needs to have at least one attribute: a peer node address attribute. A value of this attribute is a peer node address of the direct link, which usually adopts a loopback (loopback) address of the peer node. Table 1 is an exemplary table of a bypass interface in R1.

TABLE 1

| Bypass Interface | Peer Node Address |
|---|---|
| IF1 | c.c.c.c (R3) |
| ... | ... |

As shown in Table 1, IF1 is a self-defined bypass interface identity. The direct link is established between R1 and R3. For R1, a peer node is R3. Therefore, an attribute value of a "peer node address" should be an address of R3. In this embodiment, it is assumed that the address of R3 is c.c.c.c. A node address may be in an IP address form, for example, an IPv4 address or an IPv6 address, and may also be in other address forms, which is not limited in this embodiment.

For R3, a method for establishing a bypass interface is similar to that for R1, and is not repeated in this embodiment.

Step 104: The relevant node switches traffic according to an attribute of an original route and an attribute of the newly established direct link interface.

After the new interface is established, the relevant node switches the traffic according to the attribute of the original route and the attribute of the newly established direct link interface. R1 is still taken as an example for description in the following.

After an interface IF1 is established, R1 traverses a BGP route in a routing table of R1, and compares a "BGP next-hop address" attribute of each route with an attribute of "a peer node address" of the newly established IF1 interface. If values of these two attributes are matched with each other, traffic on a route that matches a comparison result is switched to the direct link.

TABLE 2

| Route | BGP Next-Hop Address |
|---|---|
| ... | ... |
| a.a.a.a/b | c.c.c.c (R3) |
| ... | ... |

Table 2 is an original BGP routing table of R1. R1 compares a "BGP next-hop address" of each route and a "peer node address" of the IF1 interface respectively, and finds that a BGP next-hop address of a route whose prefix is a.a.a.a/b is the same as a peer node address of IF1, and then an outgoing interface of this route is modified to IF1 and a direct next-hop address of this route is modified to the peer node address of IF1. In this way, original traffic from R1 to R3 (that is, a route a.a.a.a/b) is switched to the direct link.

For R3, a method for switching traffic is similar to that for R1, and is not repeated in this embodiment.

By using the preceding solution, after the direct link is established, the relevant nodes R1 and R3 establish a new type of interface for the direct link respectively. By comparing the peer node address of the newly established interface and the next-hop address of the original route, it can be ensured that only route traffic that needs to be switched is switched to the direct link. The direct link is not notified to the entire network, so that another node (such as R2) on the network does not know that this link exists. Therefore, other traffic that does not need to be switched still stays in the original route, so that the problem that abnormal traffic is drawn to the direct link is avoided.

It should be noted that in the preceding embodiments, R1 and R3 are Provider Edge routers, and a route between R1 and R3 is not marked in FIG. 3. In an actual situation, a BGP route between R1 and R3 needs to be jumped through another node. That is, R3 is not a direct next-hop node of R1; otherwise, it is not necessary to establish a direct link between R1 and R3. This situation is described in the following by using another specific embodiment.

Figure 4:
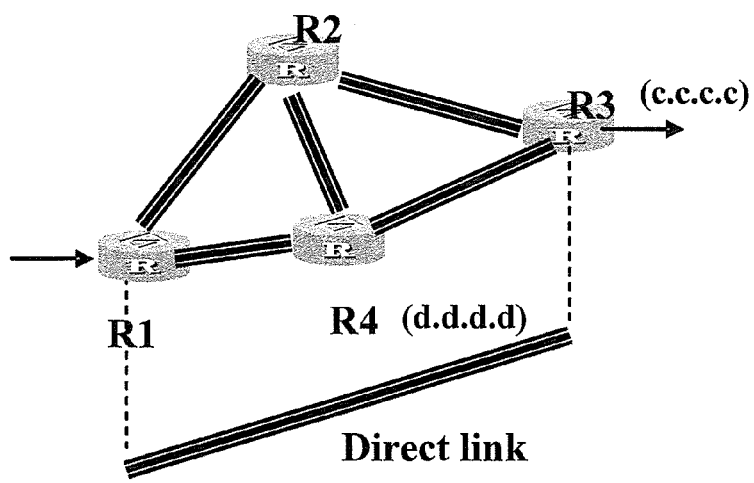
FIG. 4 is a schematic diagram of a third network according to an embodiment of the present invention.

Based on the network in the preceding embodiment, FIG. 4 further shows an internal router R4 on the network. A route from Provider Edge routers R1 to R3 is R1–R2–R3. That is, for a route a.a.a.a/b on R1, a "BGP next-hop" is R3, and a "direct next-hop" is R4.

In the prior art, a direct next-hop address of a route needs to be obtained according to iteration of a BGP routing table and an IGP (Interior Gateway Protocol, interior gateway protocol) routing table. For example, for the route a.a.a.a/b, an IGP next-hop address of the route a.a.a.a/b can be obtained through route iteration, as shown in Table 3.

TABLE 3

| Route | IGP Next-Hop Address |
|---|---|
| ... | ... |
| a.a.a.a/b | d.d.d.d (R4) |
| ... | ... |

Information recorded by an "IGP next-hop address" in Table 3 is a direct next-hop address of the route a.a.a.a/b (it is assumed that an address of R4 is d.d.d.d). Then, by using the technical solutions of the present invention, in a traffic switching process, this address is modified to a peer node address of IF1, that is, an address c.c.c.c of R3, and traffic sent by R1 arrives at R3 directly through an IF1 interface without being jumped by R4.

It should be noted that in this embodiment, an IGP is taken as an example. An internal route on the network may also be implemented in another protocol form, which is not limited in this embodiment of the present invention.

It can be seen that, by using the preceding technical solution, the problem that abnormal traffic is drawn to the direct link can be avoided, and the BGP route can quickly search a direct next-hop. In addition, obtaining a direct next-hop address does not require an operation of BGP route iteration, so that a calculation resource of a router node may be saved.

Through a description about the method in the preceding embodiments, those skilled in the art can clearly understand that the present invention can be implemented through software plus a necessary general hardware platform, and definitely, may also be implemented through hardware. In most cases, however, the former is a preferred implementation mode. Based on this understanding, the technical solutions of the present invention can be essentially or a part that contributes to the prior art can be embodied in the form of a software product. This computer software product is stored in a storage medium, and includes several instructions that make a computer device (may be a personal computer, a server, or a network device) execute all or part of steps of the method provided in each of the preceding embodiments of the present invention. The preceding storage medium may be any medium capable of storing program codes such as a read-only memory (ROM), a random access memory (RAM), a magnetic disk, or a compact disk.

Figure 5:
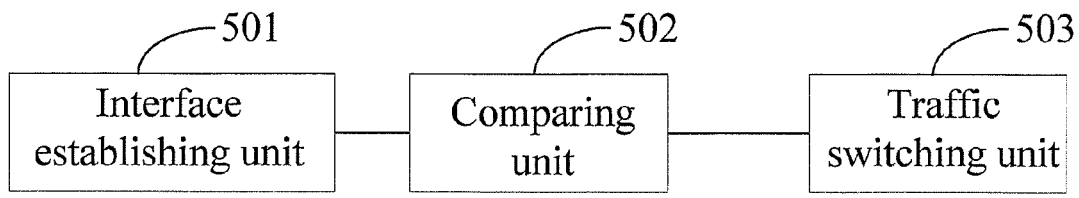
FIG. 5 is a schematic structural diagram of a network node according to an embodiment of the present invention.

Corresponding to the preceding method embodiments, a network node is further provided in an embodiment of the present invention, where a direct link exists between a local node and a peer node. As shown in FIG. 5, the network node includes:

an interface establishing unit 501, configured to establish a direct link interface, where the direct link interface has an address attribute of the peer node, and a value of the attribute is a peer node address of the direct link;

a comparing unit 502, configured to compare a border gateway protocol (BGP) next-hop address of each route in a routing table with the peer node address of the direct link; and a traffic switching unit 503, configured to switch traffic on a route that matches a comparison result of the comparing unit to the direct link.

The traffic switching unit 502 may specifically include:
a route interface modifying sub-unit, configured to modify an outgoing interface of a route to the direct link interface; and
a route address modifying unit, configured to modify a direct next-hop address of the route to the peer node address of the direct link.

After establishing a direct link, the network node provided in this embodiment establishes a new type of interface for the direct link. By comparing a peer node address of the newly established interface and a next-hop address of an original route, it can be ensured that only route traffic that needs to be switched is switched to the direct link. Other traffic that does not need to be switched still stays in the original route, so that a problem that abnormal traffic is drawn to the direct link is avoided.

A network system is further provided in an embodiment of the present invention, including a network management device and a network node, where:
the network management device is configured to establish a direct link between a first network node and a second network node; and
the network node is configured to establish a direct link interface after the network management device establishes a direct link between a local node and a peer node, where the direct link interface has an address attribute of the peer node, and a value of the attribute is a peer node address of the direct link, and compare a border gateway protocol (BGP) next-hop address of each route in a routing table with the peer node address of the direct link, and switch traffic on a route that matches a comparison result to the direct link.

The network management device can monitor traffic between network nodes and establish the direct link between the first network node and the second network node according to a traffic monitoring result.

In the network system provided in this embodiment of the present invention, after the network management device establishes a direct link, a relevant network node establishes a new type of interface for the direct link. By comparing a peer node address of the newly established interface and a next-hop address of an original route, it can be ensured that only route traffic that needs to be switched is switched to the direct link. The direct link is not notified to the entire network, so that another node on the network does not know that this link exists. Therefore, other traffic that does not need to be switched still stays in the original route, so that a problem that abnormal traffic is drawn to the direct link is avoided.

An apparatus or system embodiment is basically corresponding to the method embodiment. Therefore, relevant parts may be made reference to a description of the method embodiment. The preceding apparatus or system embodiment is only exemplary. Units that are described as separate components may be physically separated, and may also not be physically separated, and a component displayed as a unit may be a physical unit, and may also not be a physical unit. That is, the units or components may be located at one place or scattered on multiple network units. A part or all of modules may be selected according to an actual requirement to implement the objective of the solutions in the embodiments of the present invention. Those skilled in the art may understand and implement the solution without any creative effort.

In the several embodiments provided in this application, it should be understood that the disclosed system, apparatus and method can be implemented by using other methods without departing from the spirit and scope of this application. The current embodiments are only some exemplary embodiments, but should not be construed as a limitation, and the content shall not limit the objective of this application. For example, division of a unit or a sub-unit is merely logical function division. Actual implementation may use other division methods, for example, combining multiple units or sub-units. In addition, multiple units or components may be combined or integrated into another system, or some features may be neglected or not be executed.

Furthermore, schematic diagrams of the described system, apparatus, method, and different embodiments may be combined or integrated with other systems, modules, technologies, or methods without departing from the scope of this application. In addition, displayed or discussed mutual coupling, direct coupling, or a communication connection may be indirect coupling or communication connection through some interfaces, apparatuses, or units, and may be electrical, mechanical, or in another form.

The preceding descriptions are only specific implementation manners of the present invention. It should be noted that those skilled in the art may still make various modifications and variations without departing from the protection scope of the present invention. These modifications and variations shall fall within the protection scope of the present invention.

What is claimed is:

1. A method for controlling network traffic switching, wherein a direct link exists between a local node and a peer node, and the method for controlling network traffic switching comprises:
establishing, by the local node, a direct link interface, wherein the direct link interface has an address attribute of the peer node, and a value of the address attribute is a peer node address of the direct link;
comparing, by the local node, a border gateway protocol (BGP) next-hop address of each route in a routing table with the peer node address of the direct link of the direct link interface; and
based on comparing that a BGP next-hop address of a route in the routing table is the same as the peer node address of the direct link, modifying, by the local node, the direct link interface to be an outgoing interface of the route, and modifying, by the local node, the peer node address of the direct link to be a direct next-hop address of the route.

2. The method according to claim 1, wherein the direct link between the local node and the peer node is established by a method comprising:
monitoring, by a network management system, traffic between network nodes, and establishing the direct link between the local node and the peer node according to a traffic monitoring result.

3. The method according to claim 1, wherein:
the peer node address is in the form of an IPv4 address or an IPv6 address.

4. A network node, wherein a direct link exists between a local node and a peer node, and the network node comprises:
an interface establishing unit, configured to establish a direct link interface, wherein the direct link interface has an address attribute of the peer node, and a value of the address attribute is a peer node address of the direct link;
a comparing unit, configured to compare a border gateway protocol (BGP) next-hop address of each route in a routing table with the peer node address of the direct link of the direct link interface;
a route interface modifying sub-unit, configured to modify the direct link interface to be an outgoing interface of the route if a BGP next-hop address of the route in the routing table is the same as the peer node address of the direct link; and a route address modifying unit, configured to modify the peer node address of the direct link to be a direct next-hop address of the route if the BGP next-hop address of the route in the routing table is the same as the peer node address of the direct link.

5. The network node according to claim 4, wherein:
the peer node address is in the form of an IPv4 address or an IPv6 address.

6. A network system, comprising a network management device, a local node and a peer node, wherein,
the network management device is configured to establish a direct link between the local node and the peer node; and the local node is configured to establish a direct link interface after the network management device establishes a direct link between the local node and the peer node, wherein the direct link interface has an address attribute of the peer node, and a value of the address attribute is a peer node address of the direct link, and compare a border gateway protocol (BGP) next-hop address of each route in a routing table with the peer node address of the direct link of the direct link interface; if a BGP next-hop address of a route in the routing table is the same as the peer node address of the direct link, modify the direct link interface to be an outgoing interface of the route, and modify the peer node address of the direct link to be a direct next-hop address of the route.

7. The network system according to claim 6, wherein:
the network management device is configured to monitor traffic between network nodes and establish the direct link between the local node and the peer node according to a traffic monitoring result.

8. The method according to claim 1, wherein the direct next-hop address of the route is an Interior Gateway Protocol (IGP) next-hop address of the route.

9. The network node according to claim 4, wherein the direct next-hop address of the route is an Interior Gateway Protocol (IGP) next-hop address of the route.

10. The network system according to claim 6, wherein the direct next-hop address of the route is an Interior Gateway Protocol (IGP) next-hop address of the route.

\* \* \* \* \*